US 6,750,277 B1

(12) United States Patent
Yamana et al.

(10) Patent No.: US 6,750,277 B1
(45) Date of Patent: Jun. 15, 2004

(54) COMPOSITION AND TREATMENT AGENT

(75) Inventors: Masayuki Yamana, Settsu (JP); Ikuo Yamamoto, Settsu (JP); Masato Kashiwagi, Settsu (JP); Koji Kubota, Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/355,673

(22) PCT Filed: Jan. 28, 1998

(86) PCT No.: PCT/JP98/00334

§ 371 (c)(1),
(2), (4) Date: Aug. 19, 1999

(87) PCT Pub. No.: WO98/33854

PCT Pub. Date: Aug. 6, 1998

(30) Foreign Application Priority Data

| Jan. 30, 1997 | (JP) | ............................................. 9/016533 |
| Jun. 26, 1997 | (JP) | ............................................. 9/170023 |

(51) Int. Cl.$^7$ ............................ C08K 5/04; C08K 5/54; C08K 5/5415
(52) U.S. Cl. .................... 524/261; 427/331; 427/385.5; 427/387; 427/393.2; 521/65; 524/262; 524/263; 524/265; 524/266; 524/267; 524/268; 524/297; 524/317; 524/356; 524/361; 524/368; 524/376; 524/378; 524/379
(58) Field of Search .............................. 427/385.5, 387, 427/393.2, 331; 521/65; 524/261, 262, 263, 265, 266, 267, 268, 297, 317, 356, 361, 366, 376, 378, 379, 272

(56) References Cited

U.S. PATENT DOCUMENTS

| 4,920,190 | A | 4/1990 | Lina et al. |
| 5,068,295 | A | 11/1991 | Misaizu et al. |
| 5,144,056 | A | 9/1992 | Lina et al. |
| 5,350,795 | A | 9/1994 | Smith et al. |
| 5,548,022 | A | * 8/1996 | Ito et al. ..................... 524/839 |

FOREIGN PATENT DOCUMENTS

| EP | 0676458 A1 | 10/1995 |
| EP | 919576 | 6/1999 |
| GB | 583451 | 1/1981 |
| JP | 5871977 A | 4/1983 |
| JP | 626163 B2 | 2/1987 |
| JP | 6333797 B2 | 7/1988 |
| JP | 6367511 B2 | 12/1988 |
| JP | 215695 A | 1/1990 |
| JP | 2214791 A | 8/1990 |
| JP | 34542 B2 | 1/1991 |
| JP | 4080219 | 3/1992 |
| JP | 4272988 A | 9/1992 |
| JP | 5214197 A | 8/1993 |
| JP | 6157870 A | 6/1994 |
| JP | 7118596 A | 5/1995 |
| JP | 7224275 A | 8/1995 |
| JP | 8509034 A | 9/1996 |
| JP | 987457 A | 3/1997 |
| WO | WO 9424179 A1 | 10/1994 |

* cited by examiner

*Primary Examiner*—Judy M. Reddick
(74) *Attorney, Agent, or Firm*—Birch, Stewart, Kolasch & Birch, LLP

(57) ABSTRACT

A composition comprising (A) a copolymer which comprises (I) repeating units which are derived from a monomer having a fluoroalkyl group, a carbon-carbon double bond, (II) optional repeating units which are derived from a monomer having at least two urethane or urea bonds and a carbon-carbon double bond, but no fluorine atom, (III) optional repeating units which are derived from a monomer, the homopolymer of which having a glass transition temperature (Tg) of 50° C. or less, (IV) optional repeating units which are derived from a monomer having a hydrophilic group and a carbon-carbon double bond, and (V) optional repeating units which are derived from a monomer having a chlorine atom and a carbon-carbon double bond; and (B) a film-forming auxiliary can impart high water and oil repellency by drying at room temperature (0 to 30° C.) without requiring a heat treatment step.

28 Claims, No Drawings

US 6,750,277 B1

COMPOSITION AND TREATMENT AGENT

This application is the national phase under 35 U.S.C. §371 of PCT International Application No. PCT/JP98/00334 which has an International filing date of Jan. 28, 1998 which designated the United States of America.

FIELD OF THE INVENTION

The present invention relates to a novel composition, a water and oil repellent and a water and oil repellent product.

RELATED ART

A conventional water and oil repellent required a heat treatment at 100° C. or more as an essential step to impart high water and oil repellency, but various water and oil repellents have been proposed to improve processability of the water and oil repellents.

Japanese Patent Kokoku Publication No. 67511/1988 discloses a polymer obtained by binding a branch segment having a blocked fluoroalkyl group to a trunk segment of a diene copolymer, and Japanese Patent Kokai Publication No. 71977/1983 discloses that a copolymer comprising a monomer having a fluoroalkyl group and a cross-linking monomer as an essential component is a water and oil repellent which imparts high water and oil repellency in a heat treatment step at low temperature. However, when both of them are dried at room temperature, the water and oil repellency is insufficient.

Furthermore, U.S. Pat. No. 5,350,795 discloses that a composition comprising fluoroacrylate/polyalkyleneglycol (meth)acrylate/polyalkyleneglycol di(meth)acrylate copolymer and Rf-containing polyalkoxypolyurethane is a water and oil repellent which imparts high water and oil repellency when it is dried at room temperature. However the water repellency is insufficient.

A conventional water and oil repellent requires a heat treatment as an essential step to impart high water and oil repellency, and sufficient water and oil repellency could not be imparted without a heat treatment.

SUMMARY OF THE INVENTION

An object of the present invention is to provide a composition which imparts high water and oil repellency only by drying at room temperature (0 to 30° C.) without requiring a heat treatment step.

Another object of the present invention is to provide a water and oil repellent product or article comprising said composition.

The present invention provides a composition comprising
(A) a binary or more copolymer which comprises
 (1) repeating units which impart water and oil repellency,
 (2) repeating units which impart a solubility in a firm-forming auxiliary,
 (3) optional repeating units which lower the glass transition temperature of the polymer, and
 (4) optional repeating units which impart an affinity with a substrate, and
(B) a film-forming auxiliary consisting of an organic solvent which dissolves or swells the copolymer.

DETAILED DESCRIPTION OF THE INVENTION

Repeating units (1) which impart water and oil repellency may be (I) repeating units which are derived from a monomer having a fluoroalkyl group, a carbon-carbon double bond, and optionally a urethane or urea bond.

Repeating units (2) which impart solubility in (or compatibility with) a film-forming auxiliary may be (II) repeating units which are derived from a monomer having a urethane or urea bond and a carbon-carbon double bond, but no fluorine atom; or (III) repeating units which are derived from a monomer having a carbon-carbon double bond, the homopolymer of said monomer having a glass transition temperature (Tg) of at most 50° C.

Repeating units (3) which lower the glass transition temperature of the polymer may be (III) repeating units which are derived from a monomer having a carbon-carbon double bond, the homopolymer of said monomer having a glass transition temperature (Tg) of at most 50° C.

Repeating units (4) which impart an affinity with a substrate may be (IV) repeating units which are derived from a monomer having a hydrophilic group and a carbon-carbon double bond, or (V) repeating units which are derived from a monomer having a chlorine atom and a carbon-carbon double bond.

The present invention provides a composition comprising
(A) a copolymer which comprises
 (I) repeating units which are derived from a monomer having a fluoroalkyl group, a carbon-carbon double bond, and optionally a urethane or urea bond,
 (II) optional repeating units which are derived from a monomer having a urethane or urea bond and a carbon-carbon double bond, but no fluorine atom,
 (III) optional repeating units which are derived from a monomer having a carbon-carbon double bond, the homopolymer of said monomer having a glass transition temperature (Tg) of 50° C. or less,
 (IV) optional repeating units which are derived from a monomer having a hydrophilic group and a carbon-carbon double bond, and
 (V) optional repeating units which are derived from a monomer having a chlorine atom and a carbon-carbon double bond and
(B) a film-forming auxiliary consisting of an organic solvent which dissolves or swells the copolymer,
wherein at least one of the repeating units (II) and the repeating units (III) is essential in the copolymer (A).

The composition of the present invention is suitable for a treatment agent, in particular a water and oil repellent.

The repeating units (I) are essential in the copolymer (A). The repeating units (II), the repeating units (III), the repeating units (IV) and the repeating units (V) are optional repeating units which have no need to be present. But at least one of the repeating units (II) and the repeating units (III) is essential.

The copolymer (A) in the composition of the present invention may be, for example:
(a) a copolymer having the repeating units (I) and (II),
(b) a copolymer having the repeating units (I) and (III),
(c) a copolymer having the repeating units (I), (II) and (III),
(d) a copolymer having the repeating units (I), (II) and (IV) and/or (V),
(e) a copolymer having the repeating units (I), (III) and (IV) and/or (V), or
(f) a copolymer having the repeating units (I), (II), (III) and (IV) and/or (V).

The present invention provides a copolymer wherein the repeating units (I), the repeating units (II) and the repeating units (III) are essential, and the repeating units (IV) and the repeating units (V) are optional.

In the repeating units (I) a fluoroalkyl group is preferably a perfluoroalkyl group.

The repeating units (I) are preferably repeating units which are derived from (meth)acrylic ester containing a fluoroalkyl group. A monomer which constitutes the repeating units (I) is preferably a compound of the formula:

$$Rf—R^1—OCOC(R^2)=CH_2$$

wherein Rf is a linear or branched fluoroalkyl group having 3 to 20 carbon atoms;

$R^1$ is a linear or branched alkylene group having 1 to 20 carbon atoms, a group of the formula: $—SO_2N(R^3)R^4—$ or a group of the formula: $—CH_2CH(OR^5)CH_2—$ in which $R^3$ is an alkyl group having 1 to 10 carbon atoms, $R^4$ is a linear or branched alkylene group having 1 to 10 carbon atoms, and $R^5$ is a hydrogen atom or an acyl group having 1 to 10 carbon atoms; and $R^2$ is a hydrogen atom or a methyl group.

Examples of the monomer (I) having a fluoroalkyl group are not limited to, but include the followings:

$CF_3(CF_2)_7(CH_2)_{10}OCOCCH=CH_2$
$CF_3(CF_2)_7(CH_2)_{10}OCOC(CH_3)=CH_2$
$CF_3(CF_2)_6CH_2OCOCH=CH_2$
$CF_3(CF_2)_8CH_2OCOC(CH_3)=CH_2$
$(CF_3)_2CF(CF_2)_6(CH_2)_2OCOCH=CH_2$
$(CF_3)_2CF(CF_2)_8(CH_2)_2OCOCH=CH_2$
$(CF_3)_2CF(CF_2)_{10}(CH_2)_2OCOCH=CH_2$
$(CF_3)_2CF(CF_2)_6(CH_2)_2OCOC(CH_3)=CH_2$
$(CF_3)_2CF(CF_2)_8(CH_2)_2OCOC(CH_3)=CH_2$
$(CF_3)_2CF(CF_2)_{10}(CH_2)_2OCOC(CH_3)=CH_2$
$CF_3CF_2(CF_2)_6(CH_2)_2OCOCH=CH_2$
$CF_3CF_2(CF_2)_8(CH_2)_2OCOCH=CH_2$
$CF_3CF_2(CF_2)_{10}(CH_2)_2OCOCH=CH_2$
$CF_3CF_2(CF_2)_6(CH_2)_2OCOC(CH_3)=CH_2$
$CF_3CF_2(CF_2)_8(CH_2)_2OCOC(CH_3)=CH_2$
$CF_3CF_2(CF_2)_{10}(CH_2)_2OCOC(CH_3)=CH_2$
$CF_3(CF_2)_7SO_2N(CH_3)(CH_2)_2OCOCH=CH_2$
$CF_3(CF_2)_7SO_2N(C_2H_5)(CH_2)_2OCOCH=CH_2$
$(CF_3)_2CF(CF_2)_8CH_2CH(OCOCH_3)CH_2OCOC(CH_3)=CH_2$
$(CF_3)_2CF(CF_2)_6CH_2CH(OH)CH_2OCOCH=CH_2$

The monomer (I) having a urethane or urea bond and a fluoroalkyl group may be a compound of the general formula:

$$Rf^1—X^1—A^1—CONH—Y^1—NHCO—A^2—O—C(=O)—CR^3=CH_2$$

wherein $Rf^1$ is a fluoroalkyl group having 4 to 16 carbon atoms;

$X^1$ is $—R^1—$, $—CON(R^2)—Q^1—$ or $—SO_2N(R^2)—Q^1—$, in which $R^1$ is an alkylene group, $R^2$ is a hydrogen atom or a lower alkyl group and $Q^1$ is an alkylene group;

$A^1$ is $—O—$, $—S—$ or $—N(R^2)—$, in which $R^2$ is a hydrogen atom or a lower alkyl group;

$Y^1$ is a residue remaining by removing an isocyanate from an aromatic or alicyclic diisocyanate;

$A^2$ is a bivalent organic group having 2 to 9 carbon atoms and capable of containing at least one oxygen atom; and $R^3$ is a hydrogen atom or a methyl group.

Specific examples of the monomer (I) having a urethane or urea bond and a fluoroalkyl group are as follows:

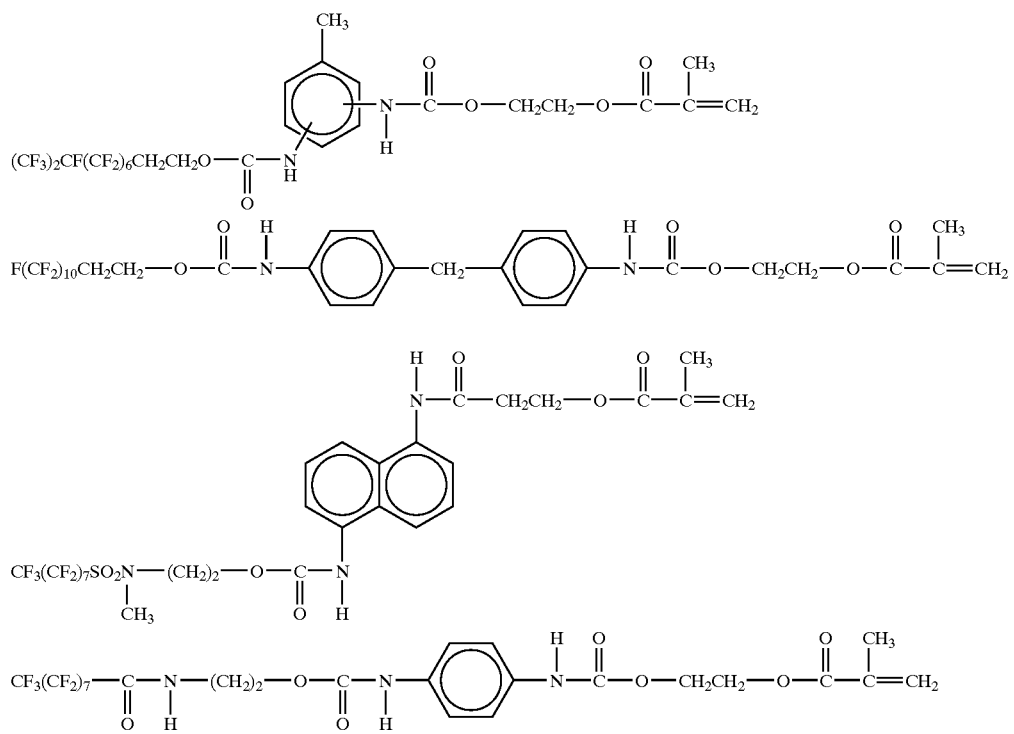

A monomer having a urethane or urea bond and a fluoroalkyl group, which constitutes the repeating units (I), may be a monomer obtained by reacting (I-a) a compound having at least two isocyanate groups, (I-b) a compound having one carbon-carbon double bond and at least one hydroxyl or amino group, and (I-c) a compound having a fluoroalkyl group and one hydroxyl or amino group; or a monomer obtained by reacting a compound having one isocyanate group and at least one carbon-carbon double bond with the compound (I-c).

The monomer (II) having a urethane or urea bond and a carbon-carbon double bond, but no fluorine atom may be a monomer obtained by reacting (II-a) a compound having at least two isocyanate groups, and (II-b) a compound having one carbon-carbon double bond and at least one hydroxyl or amino group with (II-c-1) a compound having at least one hydroxyl or amino group, and a polyoxyalkylene chain or a polysiloxane chain, or (II-c-2) a compound having at least one hydroxyl or amino group; or a monomer obtained by reacting a compound having one isocyanate group and at least one carbon-carbon double bond with the compound (II-c-1) or (II-c-2).

Examples of the compound (II-a) are as follows:

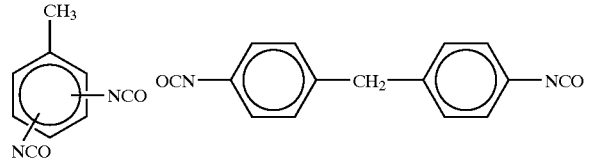
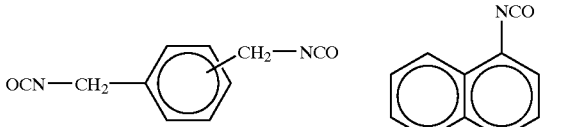
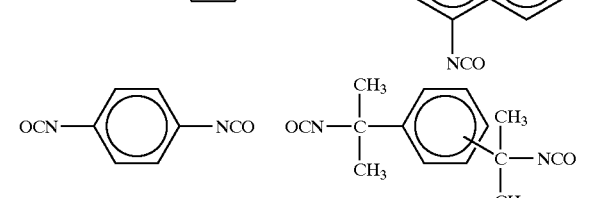
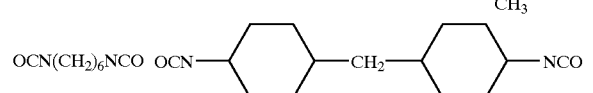
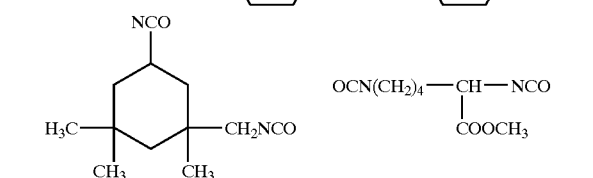
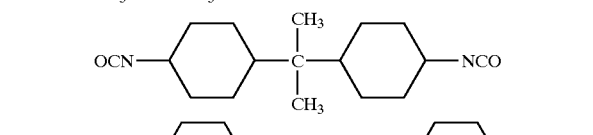

The compound (II-a) is preferably diisocyanate. But triisocyanate and polyisocyanate can be also used for the reaction.

For example, a trimer of diisocyanate, polymeric MDI (diphenylmethanediisocyanate) as well as an adduct of polyhydric alcohols such as trimethylol propane, trimethylol ethane and glycerin to a diisocyanate can be also used in the reaction.

Examples of triisocyanate and polyisocyanate are as follows:

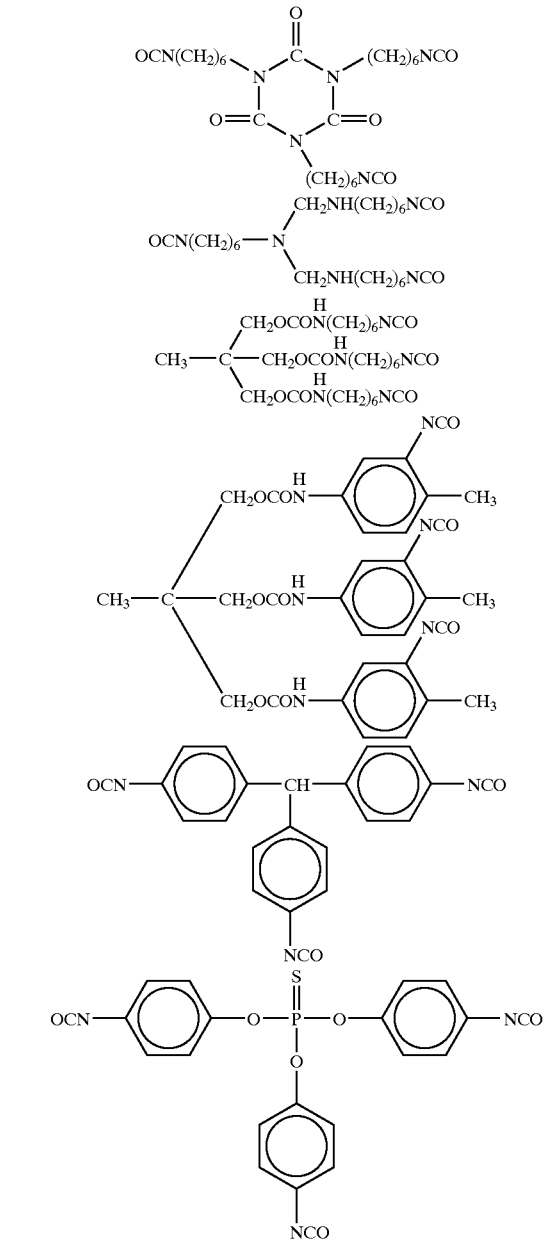

-continued

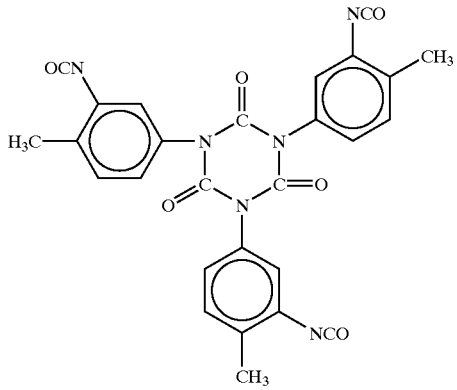

The compound (II-b) may be, for example, a compound of the formula:

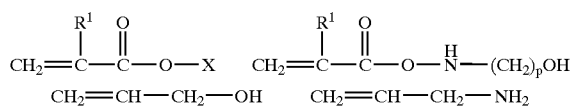

wherein $R^1$ is a hydrogen atom or a methyl group, p is a number of 1 to 300 (e.g. 1 to 20) and X is as follows:

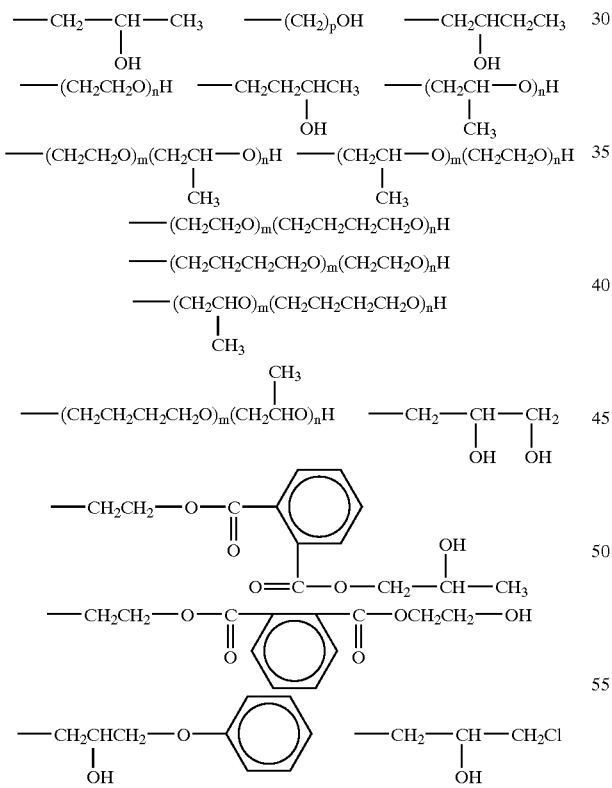

wherein p, m and n are a number of 1 to 300, respectively.

The compound (II-c-1) may be a compound of the formula:

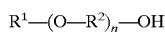
$R^1$—(O—$R^2$)$_n$—OH

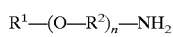
$R^1$—(O—$R^2$)$_n$—NH$_2$

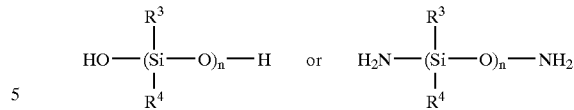

wherein $R^1$ represents a hydrogen atom or a $C_1$ to $C_{22}$ alkyl group, in the latter case a hetero atom, or an aromatic or an alicyclic compound may be contained; $R^2$ represents a linear or branched $C_1$ to $C_6$ alkylene group; $R^3$ and $R^4$ represents a hydrogen atom or a $C_1$ to $C_6$ alkyl group which optionally contains a hetero atom, or an aromatic or an alicyclic compound, or optionally contains a modification such as fluorine modification, polyether modification, alcohol modification, amino modification, epoxy modification, epoxy ether modification, phenol modification, carboxyl modification, and mercapto modification; and n represents an integer of 1 to 50. Preferred $R^1$, $R^3$ and $R^4$ groups are $CH_3$ and preferred $R^2$ group is $C_2H_4$ and $C_3H_6$.

Examples of the compound (II-c-1) are polyethylene glycol monomethyl ether, polypropylene glycol monomethyl ether, end silanol group dimethyl silicone and end amino-modified dimethyl silicone.

The compound (II-c-2) has neither of a polyoxyalkylene chain nor a polysiloxane chain. The compound (II-c-2) may be a compound of the formula:

$R^2$—OH $R^2$—$NH_2$ or $R^2$—NH—$R^3$ wherein $R^2$ and $R^3$, the same or different, represent a $C_1$ to $C_{22}$ alkyl group and optionally contain a hetero atom, or an aromatic or an alicyclic compound. Preferred $R^2$ and $R^3$ groups are $C_8H_{17}$, $C_{18}H_{37}$, $C_4H_9$ and cyclohexyl.

Examples of the compound (II-c-2) include butyl alcohol, 2-ethylhexyl alcohol, lauryl alcohol, stearyl alcohol, oleyl alcohol, benzyl alcohol, cyclohexyl alcohol, 2-ethylhexylamine and stearylamine.

The compound (II-a), (II-b) and (II-c-1) or (II-c-2) are reacted in amounts of, when (II-a) is diisocyanate, one mol of (II-b) and (II-c-1) or (II-c-2) per one mol of (II-a), and when (II-a) is triisocyanate, one mol of (II-b) and two mols of (II-c-1) or (II-c-2) per one mol of (II-a).

A monomer which constitutes the repeating units (III) may be a monomer having conjugated double bonds or one or two carbon-carbon double bonds, and a glass transition temperature (Tg) of 50° C. or less, for example 30° C. or less, particularly 0° C. or less.

The term "a monomer having a glass transition temperature (Tg) of 50° C. or less" means that the homopolymer consisting of said monomer has a glass transition temperature (Tg) of 50° C. or less. Tg was measured by using DSC, Model 7 manufactured by Perkin Elmer Co.

A monomer which constitutes the repeating units (III) is preferably a diene monomer, a (meth)acrylic ester monomer or a di(meth)acrylic ester monomer.

The (meth)acrylic ester monomer may be a compound of the general formula:

$CH_2$=$CA^1COOA^2$ or

$CH_2$=$CA^1COO(R^1$—O)$_n$—$A^2$ wherein $A^1$ is a hydrogen atom or a methyl group,
$A^2$ is a linear or branched $C_1$ to $C_{30}$ alkyl group,
$R^1$ is a linear or branched $C_1$ to $C_6$ alkylene group and
n is an integer of 1 to 30.

The di(meth)acrylic ester monomer may be a compound of the general formula:

$$CH_2=CA^1COO(R^1)_nOOCA^1C=CH_2$$

or $$CH_2=CA^1COO(R^1-O)_n-OCA^1C=CH_2$$

wherein $A^1$ is a hydrogen atom or a methyl group,
$R^1$ is a linear or branched $C_1$ to $C_6$ alkylene group, and
n is an integer of 1 to 30.

Examples of the monomer having a glass transition temperature of 30 to 50° C. include cetyl acrylate and isobutyl methacrylate for examples of the (meth)acrylic ester monomer; and polyethylene glycol(4)diacrylate for examples of the di(meth)acrylic ester monomer.

Examples of the monomer having a glass transition temperature of 0 to 30° C. include methyl acrylate, n-butyl methacrylate, and cetyl methacrylate for examples of the (meth)acrylic ester monomer.

Examples of the monomer having a glass transition temperature of 0° C. or less include isoprene and 1,3-butadiene for examples of the diene monomer; and ethyl acrylate, n-butyl acrylate, n-octyl acrylate, 2-ethylhexyl (meth)acrylate, n-lauryl (meth)acrylate for examples of the (meth)acrylic ester monomer.

A monomer which constitutes the repeating units (IV) and has a hydrophilic group and a carbon-carbon double bond may be, for example a compound of the formula:

$$CH_2=CA^1-C(=O)-X^1-A^2$$

wherein $A^1$ is a hydrogen atom or a methyl group,
$X^1$ is —O—, —$CH_2$— or —NH—,
$A^2$ is a hydrogen atom, a hydrophilic group or a group containing a hydrophilic group.

Examples of the hydrophilic group include a hydroxyl group, a glycidyl group, an ester group, an amine group, a urethane group, a phosphate group, a sulfate group and the like.

Examples of the monomer which constitutes the repeating units (IV) include glycidyl methacrylate, hydroxypropyl methacrylate, 2-hydroxy-3-phenoxypropyl acrylate, 2-hydroxyethyl acrylate, glycerol monomethacrylate, β-acryloyloxyethyl hydrogen succinate, β-methacryloyloxyethyl hydrogen phthalate, 2-acryloyloxyethylhexahydrophthalic acid, 2-acryloyloxyethylphthalic acid, 2-acryloyloxyethyl-2-hydroxyethylphthalic acid, hydroxypropyl methacrylate trimethylammonium chloride, dimethylaminoethyl methacrylate, diethylaminoethyl methacrylate, 2-acryloyloxyethyl acid phosphate, glucosylethyl methacrylate, methacrylamide, 2-acrylamido-2-methylpropanesulfonic acid, 2-hydroxy-3-acryloyloxypropyl methacrylate, 2-methacryloyloxyethyl acid phosphate and neopentyl glycol hydroxypivalate diacrylate.

A monomer which constitutes the repeating units (V) and has a chlorine atom and a carbon-carbon double bond may be, for example, a compound of the formula:

$$CY^1Y^2=CY^3-Z$$

wherein $Y^1$ and $Y^2$ is respectively a hydrogen atom or a fluorine atom,
$Y^3$ is a hydrogen atom, a fluorine atom, a chlorine atom or a methyl group,
Z is a chlorine atom or a chlorine atom-containing group.

Examples of the chlorine-containing monomer which constitutes the repeating units (V) include vinyl chloride, vinylidene chloride, 3-chloro-2-hydroxypropyl methacrylate and monochlorotrifluoroethylene.

A weight average molecular weight of the copolymer (A) is preferably from 2,000 to 1,000,000.

The amount of the repeating units (I) is preferably from 40 to 90% by weight,
and more preferably from 50 to 80% by weight,
the amount of the repeating units (II) is 60% by weight or less, e.g. from 5 to 60% by weight, and more preferably from 10 to 50% by weight,
the amount of the repeating units (III) is 60% by weight or less, e.g. from 1 to 60% by weight, and more preferably from 1 to 50% by weight,
the amount of the repeating units (IV) is 30% by weight or less, and more preferably from 0.1 to 20% by weight, and
the amount of the repeating units (V) is 30% by weight or less, and more preferably from 0.1 to 20% by weight,
based on the amount of the copolymer (A).

The film-forming auxiliary (B) which facilitates the film-forming of the copolymer (A) by existing together with the copolymer (A) is preferably those which dissolves, swells or softens the copolymer (A).

The film-forming auxiliary (B) may be (i) an alcohol, glycol ether, ketone, ether and ester having a $C_1$ to $C_{22}$ alkyl chain, or (ii) a linear or cyclic silicone.

The film-forming auxiliary (B) (i) may be a compound containing a fluorine atom, a hetero atom, an aromatic ring or an aliphatic ring.

The film-forming auxiliary (B) (ii) may be a compound of the formula:

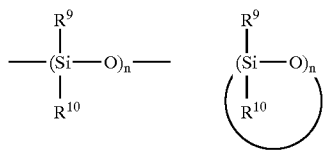

wherein $R^9$ and $R^{10}$ each represents a hydrogen atom or a $C_1$ to $C_6$ alkyl group, which optionally contains a hetero atom, an aromatic or an alicyclic compound, or optionally contains a modification such as fluorine modification, polyether modification, alcohol modification, amino modification, epoxy modification, epoxy ether modification, phenol modification, carboxyl modification and mercapto modification; and n represents a number of 1 to 50.

As the film-forming auxiliary (B), a compound having the value of the solubility parameter (sp) at 25° C. of 5 to 15, e.g. 8 to 11 is suitable. The solubility parameter is calculated according to Fedors' method (R. F. Fedors, Polym. Eng. Sci., 14(2), 147(1974)).

The role of the film-forming auxiliary is to dissolve, swell or soften the copolymer (A) and induce film-formation of the copolymer (A) with a low calorie. This makes it possible to impart high water and oil repellency without requiring any heat treatment step. The film-forming auxiliary may be single compound or two or more of them may be used in combination. The film-forming auxiliary may be the same as or different from the polymerization solvent.

Examples of the film-forming auxiliary (B) include, for example, ethanol, dipropylene glycol monomethyl ether, 1-methoxy-2-propanol, diethylene glycol acetate monoethyl ether, di-n-butyl adipate, butyl carbitol acetate, octamethyltrisiloxane and decamethylcyclopentasiloxane.

The composition of the present invention may comprise 30 to 99.9 parts by weight, particularly 40 to 95 parts by weight, e.g. 50 to 80 parts by weight of the copolymer (A) and 0.1 to 70 parts by weight, particularly 5 to 60 parts by weight, e.g. 20 to 50 parts by weight of the film-forming auxiliary (B).

The copolymer can be prepared by emulsion polymerization, solution polymerization or suspension polymerization. In particular, the emulsion polymerization is preferred.

The copolymer of the present invention can also be produced in an aqueous emulsion. Monomers are emulsion-polymerized by use of water, an emulsifying agent and optionally an organic solvent. The film-forming auxiliary (B) may be added before or after the emulsion polymerization. The mixture may previously be emulsified by a high-pressure emulsifying machine or the like before polymerization.

The emulsifying agent used may be any type of a surface active agent, such as an anionic, cationic or nonionic surface active agent.

Examples of the anionic surface active agent include sodium lauryl sulfate, lauryl sulfate triethanolamine, sodium polyoxyethylene lauryl ether sulfate, sodium polyoxyethylene nonyl phenyl ether sulfate, polyoxyethylene lauryl ether sulfate triethanolamine, sodium cocoyl sarcosine, sodium N-cocoyl methyl taurine, sodium polyoxyethylene coconut alkyl ether sulfate, sodium diether hexyl sulfosuccinate, sodium α-olefin sulfonate, sodium lauryl phosphate, sodium polyoxyethylene lauryl ether phosphate, and perfluoroalkyl carboxylate salt (Unidine DS-101 and 102 manufactured by Daikin Industries Ltd.).

Examples of the cationic surface active agent include dialkyl ($C_{12}$–$C_{22}$) dimethyl ammonium chloride, alkyl (coconut) dimethyl benzyl ammonium chloride, octadecyl amine acetate salt, tetradecyl amine acetate salt, tallow alkyl propylene diamine acetate salt, octadecyl trimethyl ammonium chloride, alkyl (tallow) trimethyl ammonium chloride, dodecyl trimethyl ammonium chloride, alkyl (coconut) trimethyl ammonium chloride, hexadecyl trimethyl ammonium chloride, behenyl trimethyl ammonium chloride, alkyl (tallow) imidazoline quaternary salt, tetradecyl methyl benzyl ammonium chloride, octadecyl dimethyl benzyl ammonium chloride, dioleyl dimethyl ammonium chloride, polyoxyethylene dodecyl monomethyl ammonium chloride, polyoxyethylene alkyl ($C_{12}$–$C_{22}$) benzyl ammonium chloride, polyoxyethylene lauryl monomethyl ammonium chloride, 1-hydroxyethyl-2-alkyl (tallow) imidazoline quaternary salt, a silicone-based cationic surface active agent having a siloxane group as a hydrophobic group, and a fluorine-based cationic surface active agent having a fluoroalkyl group as a hydrophobic group (Unidine DS-202 manufactured by Daikin Industries Ltd.).

Examples of the nonionic surface active agent include polyoxyethylene lauryl ether, polyoxyethylene tridecyl ether, polyoxyethylene cetyl ether, polyoxyethylene polyoxypropylene cetyl ether, polyoxyethylene stearyl ether, polyoxyethylene oleyl ether, polyoxyethylene nonyl phenyl ether, polyoxyethylene octyl phenyl ether, polyoxyethylene monolaurate, polyoxyethylene monostearate, polyoxyethylene mono-oleate, sorbitan monolaurate, sorbitan monostearate, sorbitan monopalmitate, sorbitan monostearate, sorbitan mono-oleate, sorbitan sesqui-oleate, sorbitan trioleate, polyoxyethylene sorbitan monolaurate, polyoxyethylene sorbitan monopalmitate, polyoxyethylene sorbitan monostearate, polyoxyethylene sorbitan mono-oleate, polyoxyethylene polyoxypropylene block polymer, polyglycerin fatty acid ester, polyether-modified silicone oil (SH3746, SH3748, SH3749 and SH3771 manufactured by Toray Dow Corning Silicone Co., Ltd.), perfluoroalkyl ethylene oxide adduct (Unidine DS-401 and DS-403 manufactured by Daikin Industries Ltd.), fluoroalkyl ethylene oxide adduct (Unidine DS-406 manufactured by Daikin Industries Ltd.), and perfluoroalkyl oligomer (Unidine DS-451 manufactured by Daikin Industries Ltd.).

Examples of the organic solvent used in the emulsion polymerization are the same as the organic solvent used in the solution polymerization described hereinafter.

The copolymer of present invention can be produced by the solution polymerization in an organic solvent. Examples of the organic solvent include ketones such as acetone, methyl ethyl ketone and methyl isobutyl ketone; esters such as ethyl acetate, propyl acetate, butyl acetate, dibutyl adipate and dibutyl succinate; alcohols such as ethanol, isopropanol, butanol, 1,3-butanediol and 1,5-pentanediol; halogenated hydrocarbon such as perchlorethylene, trichlene, 1,1-dichloro-2,2,3,3,3-pentafluoropropane, 1,3-dichloro-1,2,2,3,3-pentafluoropropane and 1,1-dichloro-1-fluoroethane (HCFC-141b); hydrocarbons such as octane, petroleum, toluene and xylene; dipropylene glycol, dipropylene glycol monomethyl ether, tripropylene glycol monomethyl ether, polypropylene glycol, triethylene glycol dimethyl ether, propylene glycol and ethylene glycol.

The preferred organic solvents are ketones such as methyl ethyl ketone and methyl isobutyl ketone; ethyl acetate, 1,1-dichloro-1-fluoroethane and the like.

In polymerization, a polymerization initiator, an ionizing radiation such as γ-ray and the like is used to initiate the polymerization. Examples of the polymerization initiator are an organic peroxide, an azo compound, a persulfate salt and the like.

Examples of the organic peroxide include t-butyl peroxy pivalate, benzoyl peroxide, lauroyl peroxide, di-t-butyl peroxide and diisopropyl peroxy dicarbonate. Examples of the azo compound include 2,2'-azobisisobutyronitrile, 2,2'-azobis(2-amidinopropane)dihydrochloride, 2,2'-azobis(2-methyl butaneamidooxime)dihydro-chloride and 2,2'-azobis (2-methylbutyronitrile).

The copolymer of the present invention can be used as a treatment agent. The treatment agent may be a water and oil repellent. The treatment agent comprises the copolymer and the film-forming auxiliary, an optional polymerization solvent and diluting solvent. The diluting solvent may be water, an alcohol (e.g. alkanol), a ketone, an ester, an ether (e.g. a glycol ether) or a mixture of them. In particular, the diluting solvent is preferably water. The film-forming auxiliary, the diluting solvent and the polymerization solvent may be different one another. When the diluting solvent and the polymerization solvent are different each other, the polymerization solvent may be removed (by evaporation, etc.) before using the treatment agent.

The alcohol used as the diluting solvent includes $C_1$ to $C_4$ lower alkanols such as methanol, ethanol, 2-propanol and n-butanol. Among these lower alkanols, ethanol and 2-propanol are preferable in view of safety. Alkanols having at least five carbon atoms are not preferable because of poor drying characteristics. These lower alkanols can be used singly or in combination thereof.

Solvents such as isoparaffin, n-heptane, n-hexane, mineral terpene, ethyl acetate, toluene, methyl ethyl ketone and methyl isobutyl ketone can be added at a less dangerous level. An alternative fluorocarbon such as fluorocarbon 141b can also be used as a matter of course. Further, the addition of a small amount of glycol ethers such as dipropylene glycol monomethyl ether is also effective in preventing whitening.

A wide variety of additives can be added to the treatment agent of the present invention according to necessity. Among the additives, an organopolysiloxane is important because it can improve water repellency. The organopolysiloxane used may be a silicone oil, a silicone dispersion or a mixture thereof. The silicone oil is most typically dimethyl polysiloxane having various degrees of polymerization at a viscosity ranging from 0.65 to 300,000 cS at 25° C., which is represented by the following formula:

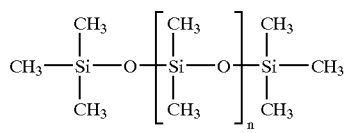

Further, a main chain of some organopolysiloxanes may contain a small amount of the following group:

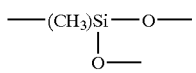

Other examples include those having —(CH$_3$CH$_2$)SiO—, —CH$_3$)HSiO—, —(C$_6$H$_5$)$_2$SiO—, —(C$_6$H$_5$)(CH$_3$)SiO— or a mixture of these groups, in place of —(CH$_3$)$_2$SiO—. Further, some organopolysiloxanes may have the terminal of the main chain Si—O—Si substituted with a hydroxyl group. Further, there are a wide variety of modified silicone oil having these side chains chlorinated or being modified by introducing an amino group, epoxy group, polyether group, carboxyl group, hydroxyl group, trifluoroalkyl group, alcohol ester group, alkyl group or the like. The silicone dispersion is a dispersion in which silicone resin or silicone rubber at an initial stage of polymerization has been dissolved in a solvent, and it forms a film having a three-dimensional network structure through condensation upon heating. In the present invention, a wide variety of organopolysiloxanes can be used without limitation to those enumerated above. For these organopolysiloxanes, there are many types of commercial products. Examples of the commercial products include SH200, PRX413, SH8011 and SD8000 (manufacture by Toray Dow Corning Silicone Co., Ltd.), KP-801M, KPN-3504 (manufactured by Shin-Etsu Chemical Co., Ltd.). The amount of organopolysiloxane incorporated may be from about 0.05 to about 10% by weight, preferably from about 0.5 to 5% by weight, based on the treatment agent of the present invention.

Stain preventing agents, UV absorbents, surface active agents, disinfectants, insecticides, antistatic agents, perfumes or the like as described in Japanese Patent Kokoku Publication Nos. 6163/1987 and 33797/1988 may be added to the treatment agent of the present invention according to necessity. In order to soften treated fabrics, to prevent charging of treated fabrics, to improve water and oil repellency and to improve shrink-resistance, an antistatic agent, an aminoplast resin, an acrylic polymer, a natural wax, a silicone resin or the like may further be added in such amounts that the effect of the present invention is not inhibited.

The treatment agent, in particular the water and oil repellent of the present invention may be composed of aqueous emulsion-type composition prepared by the emulsion polymerization method.

The water and oil repellent of the present invention can be applied to a substrate according to a conventionally known method. A method of dispersing said water and oil repellent into an organic solvent or water to dilute it, attaching it on the surface of the substrate by a procedure such as dip application, spray application, foam application to the substrate and the like, and drying it is usually adopted. The drying may be carried out by allowing to stand (solar drying or shade drying) at room temperature (0 to 30° C.) or by heat-drying with a household dryer, an iron and a drier. If necessary, the curing may be also carried out by applying the water and oil repellent together with an appropriate closslinking agent. Furthermore, in addition to the water and oil repellent of the present invention, mothproofing agents, softening agents, anti-microbial agents, flame-retardants, antistatic agents, paint primers and crease-retardants can also be added and used in combination. In case of the dip application, the concentration of the copolymer in the treatment liquid may be from 0.05 to 10% by weight. In case of the spray application, the concentration of the copolymer in the treatment liquid may be from 0.1 to 5% by weight.

The water and oil repellent may be in the form of emulsion, aerosol, solid or paste.

The water and oil repellent may be used in a water and oil repellent product or article.

The water and oil repellent product may comprise, for example (a) a water and oil repellent alone, (b) a water and oil repellent and an application apparatus, or (c) a water and oil repellent and a container in which the water and oil repellent is contained.

The water and oil repellent product which comprises a water and oil repellent emulsion may be for example (i) a water and oil repellent product comprising a water and oil repellent which is charged in a container equipped with a mechanism for spraying a liquid in said container outside (for example using a trigger type container); or (ii) a water and oil repellent product comprising a water and oil repellent which is charged in a container equipped with a mechanism for propelling a liquid in said container outside using a pressure (for example using a manual pump container or an aerosol type container). It may be also a water and oil repellent product in the form of foam comprising the emulsion containing additionally a foaming agent which is charged in the container of (i) or (ii). When a water and oil repellent product in the form of foam is used, examples of the foaming agent which is added to the emulsion are preferably an anionic surfactant, a cationic surfactant, an amphoteric surfactant or a nonionic surfactant which has the foaming property previously known.

As the anionic surfactant, for example, sodium alkyl aryl sulfonate salt, sodium alkyl sulfuric ester salt, sodium alkyl sulfonate, sodium dialkyl sulfosuccinate, sodium polyoxyethylene alkyl aryl ether sulfuric ester, sodium polyoxyethylene alkyl ether sulfuric ester, sodium perfluoroalkylamido-N-propionate salt and the like are preferred.

As the cationic surfactant, alkyl aryl trimethyl ammonium chloride, alkyl trimethyl ammonium chloride and alkyl dimethyl amine acetate salt are preferred.

As the amphoteric surfactant, for example, alkylbetaine and alkylimidazoline are preferred.

As the nonionic surfactant, for example, polyoxyethylene alkyl ether, polyoxyethylene alkyl aryl ether, polyoxyethylene fatty acid ester, polyoxyethylene alkylamide, polyoxyethylene lanolin alcohol, polyoxyethylene sorbitan fatty acid ester, polyoxyethylene sorbitol fatty acid ester, dimethylalkylamine oxide, bishydroxyethyl alkylamine oxide, N-alkylmorpholine oxide, polyoxyethylene fatty acid alkylolamide and sucrose ester are preferred.

Among them, the foaming agent is preferably those which have the initial foam height of at least 30 mm at the concentration of the foaming surfactant of 0.1% by weight at 30° C. when measuring according to the foaming measurement method of JIS K-3362.

The amount of the foaming surfactant is preferably from 0.007 to 2 parts by weight based on 100 parts by weight of the treatment agent of the present invention.

The water and oil repellent is sprayed or coated to the substrate, or the substrate is dipped into the water and oil repellent using these water and oil repellent products. When it is coated, a coating apparatus such as a sponge, a roller or a brush may be used and these coating apparatuses may be equipped in the container.

The water and oil repellent in the form of solid or paste is applied to the substrate. The water and oil repellent product which comprises the water and oil repellent in the form of solid may be charged in a stick type container such that being used for a lipstick or in a box type container such that being used for car wax. The water and oil repellent product which comprises the water and oil repellent in the form of paste may be charged in a tube type container such that being used for a dentifrice or in a box type container such that being used for car wax. When the water and oil repellent is applied, an application apparatus such as a sponge, a roller or a brush may be used and these application apparatuses may be equipped in the container.

The water and oil repellent of the present invention may be used as an aerosol. The water and oil repellent of the present invention can easily form the aerosol by adding a propellant to the stock liquid and charging in a container. As the propellant, liquid petroleum gas (LPG), propane, butane, dimethyl ether, carbon dioxide, nitrogen gas and the like can be used. Optionally, an alternative fluorocarbon such as HFC-134a and HCFC-141b is also used. The weight ratio of the stock liquid to the propellant is from 99.5/0.5 to 30/70, and preferably from 99/1 to 50/50.

A substrate to be treated with the water and oil repellent of the present invention is preferably a textile. As the textile, various examples can be recited. Examples of them include an animal- and vegetative-origin natural fiber such as cotton, hemp, wool and silk; a synthetic fiber such as a polyamide, a polyester, polyvinyl alcohol, polyacrylonitrile, polyvinyl chloride and polypropylene; a semi-synthetic fiber such as rayon and acetate; an inorganic fiber such as glass fiber, carbon fiber and asbestos fiber; or a mixture of these fibers.

The textile may be any of in the form of yarn, fabric and the like. Examples of the substrate which can be treated with the water and oil repellent of the present invention include glass, paper, wood, leather, fur, asbestos, brick, cement, metal and metal oxide, ceramics (e.g. tile), plastic, coating surface and plaster, rubber, cork and the like, in addition to a textile.

Examples of the substrate to be treated include:
garments, for example, undergarment, hosiery, overgarment, trousers, coat, raincoat, hat, gloves, shoes, boots, kimono, formalwear, full dress, accessory, dress shirt, necktie, belt, slippers, fastener and clothing for pet;

interiors, for example, outer packaging of light fitment, chair, sofa, table, drawer, sideboard, wall paper, wall material, tatami (Japanese mat), floor material, screen, paper screen, window screen, glass, curtain, carpet, mat and dust-bin:

kitchen apparatus, for example, range hood, sink, counter top, exhaust fan, tablecloth, dust receiver of sink, coaster and apron;

bath and toilet article, for example, bathtub, tile, basin, bath pail, toilet bowl, paper holder and bedpan;

bedclothings, for example, bed, bed pad and futon (Japanese bedding);

domestic appliances, for example, inner and outer packaging of refrigerator, inner and outer packaging of washing machine, outer packaging of AV apparatus, outer packaging of telephone, outer packaging of air conditioner and outer packaging of cleaner;

travel and leisure goods, for example, suitcase, lingerie case, toilet goods porch and cosmetic porch;

car and bike goods, for example, glass, mirror, lamp, seat, inner lining, mat, wheel, outer packaging, inner lining of trunk and wiper;

sports and outdoor goods, for example, gloves, baseball gloves, shoes, wear, cap, helmet, racket, golf club, bat, ski boards, snow board, skating board, beach goods, goggle, tent, sleeping bag, sheet, swimsuit, wetsuit, ball, bag, rucksack and fishing tackle;

other daily use sundries, for example, umbrella, bag, purse, key, outer packaging of mobile phone, watch, eyeglasses, sunglasses, pocket date book, buisiness card, toy, book, outer packaging of game machine, pet goods, instrument, baby bogie, tricycle and bicycle; and facility, for example, outer packaging of post and telephone box.

PREFERRED EMBODIMENTS OF THE INVENTION

The following Examples and Comparative Examples further illustrate the present invention in detail. In the Examples and Comparative Examples, parts and percentage are by weight unless otherwise stated.

Water repellency and oil repellency shown in the Examples and Comparative Examples are expressed by the following evaluations. Water repellency is expressed in terms of water repellency No. (see Table 1 below) by a spray method in accordance with JIS (Japenese Industrial Standard) L-1092. Oil repellency is expressed in terms of oil repellency No. by observing the state whether the drop can be maintained on the cloth for 30 seconds after one drop (about 5 mm in diameter) of a test solution shown in Table 2 below is placed on a sample cloth (AATCC TM118-1992). The symbol "+" assigned to water repellency No. indicates slightly good performance and the symbol "−" indicates slightly poor performance.

TABLE 1

| Water repellency No. | State |
| --- | --- |
| 100 | No wet on the surface |
| 90 | Slight wet on the surface |
| 80 | Partial wet on the surface |
| 70 | Wet on the surface |
| 50 | Wet on the whole surface |
| 0 | Complete wet on the front and back surfaces |

TABLE 2

| Oil repellency No. | Test solution | Surface tension (dyne/cm, 25° C.) |
|---|---|---|
| 8 | n-Heptane | 20.0 |
| 7 | n-Octane | 21.3 |
| 6 | n-Decane | 23.5 |
| 5 | n-Dodecane | 25.0 |
| 4 | n-Tetradecane | 26.7 |
| 3 | n-Hexadecane | 27.3 |
| 2 | Mixture of n-hexadecane/nujol (35/65) | 29.6 |
| 1 | Nujol | 31.2 |
| 0 | inferior to 1 | — |

The preparation of the monomer (I) or (II) having a urethane bond is shown in Preparative Examples 1 to 3.

PREPARATIVE EXAMPLE 1 (PREPARATION OF THE PRODUCT U1)

In a flask equipped with a stirrer, a thermometer, a reflux condenser and a dropping funnel, 348 g of 2,4-tolylene diisocyanate was dissolved in 348 g of methyl isobutyl ketone (MIBK) and heated to 80° C. with purging with nitrogen and stirring. When the temperature of the mixture reached 80° C., two drops of dibutyltin laurate was added and, at the same time, dropwise addition of 260 g of perfluoroalkylethyl alcohol (a perfluoroalkyl group is $CF_3(CF_2)_n$ (the average of n is 3.5)) was started and it was gently added dropwise over two hours. After the completion of the dropwise addition, 260 g of 2-hydroxyethyl methacrylate was gently dropped over two hours. After the completion of the dropwise addition, the stirring was continued for additional two hours with maintaining at 80° C. Then, MIBK was distilled off under reduced pressure to give 868 g of pale yellow and transparent viscous liquid. Complete disappearance of a —NCO group was confirmed by IR and disappearance of a —OH group, formation of a urethane bond and presence of a double bond were confirmed by $^1$H-NMR and $^{13}$C-NMR. This product was named as U1.

The chemical formula of the product U1 was considered as follows:

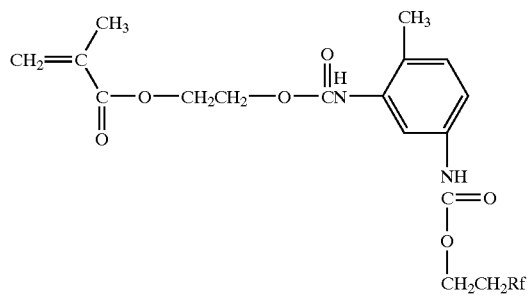

wherein Rf is a perfluoroalkyl group.

PREPARATIVE EXAMPLE 2 (PREPARATION OF THE PRODUCT U2)

The reaction was conducted in the same manner as Preparative Example 1 except that dipropylene glycol monomethyl ether was added dropwise instead of perfluoroalkylethyl alcohol. This product was named as U2.

The chemical formula of the product U2 was considered as the following:

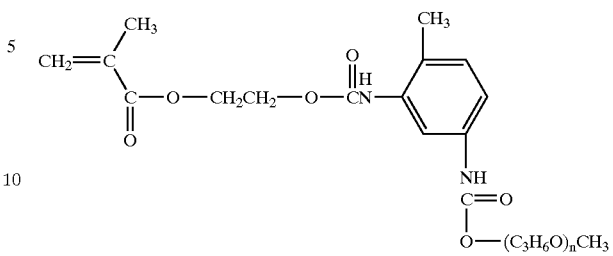

wherein n is 2.

PREPARATIVE EXAMPLE 3 (PREPARATION OF THE PRODUCT U3)

The reaction was conducted in the same manner as Preparative Example 1 except that end silanol group-containing polydimethyl siloxane was added dropwise instead of perfluoroalkylethyl alcohol. This product was named as U3.

The chemical formula of the product U3 was considered as follows:

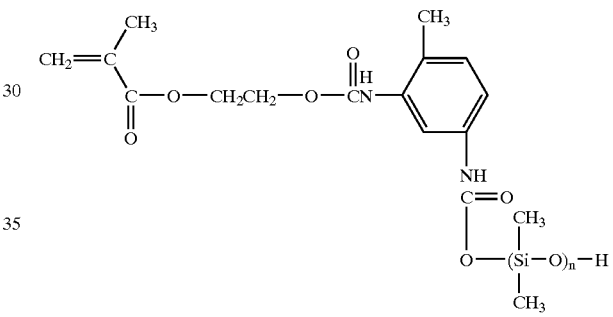

wherein the average of n is 10.

The monomers shown in Table 3 were used in the following Preparative Examples.

TABLE 3

Monomer a $$\text{CH}_2=\text{C}(\text{CH}_3)-\text{C}(=\text{O})-\text{O}-\text{CH}_2\text{CH}_2-\text{O}-\text{C}(=\text{O})\text{NH}-\text{C}_6\text{H}_3(\text{CH}_3)-\text{NH}-\text{C}(=\text{O})-\text{O}-\text{C}_8\text{H}_{17}$$

Monomer b $$\text{CH}_2=\text{CH}-\text{C}(=\text{O})-\text{O}-\text{CH}_2\text{CH}_2-\text{C}_8\text{F}_{17}$$

PREPARATIVE EXAMPLE 4

35 g of U1 (a fluorine- and urethane bond-containing monomer) synthesized in Preparative Example 1, 10 g of the monomer a (a urethane bond-containing monomer) shown in Table 3, 5 g of isoprene, 1 g of lauryl mercaptan, 1.5 g of sodium α-olefin sulfonate, 3.5 g of polyoxyethylene nonyl phenyl ether, 10 g of dipropylene glycol monomethyl ether and 114 g of ion-exchanged water were charged and pre-emulsified by using a high pressure homogenizer. This emulsion was transferred to a flask equipped with a stirrer, a thermometer and a reflux condenser, nitrogen purge was conducted sufficiently at 60° C., and then 0.3 g of ammonium persulfate was added to initiate the polymerization. At 10 hours after the initiation of polymerization, it was confirmed that 99% of U1 had reacted by gas chromatography and an emulsion having the solid content of 30% was obtained.

PREPARATIVE EXAMPLE 5

35 g of the monomer b (fluorine-containing acrylate) shown in Table 3, 10 g of U2 (a urethane bond-containing monomer) synthesized in Preparative Example 2, 5 g of isoprene, 1 g of lauryl mercaptan, 1. 5 g of sodium α-olefin sulfonate, 3.5 g of polyoxyethylene nonyl phenyl ether, 10 g of dipropylene glycol monomethyl ether and 114 g of ion-exchanged water were charged and pre-emulsified by using a high pressure homogenizer. This emulsion was transferred to a flask equipped with a stirrer, a thermometer and a reflux condenser, nitrogen purge was conducted sufficiently at 60° C., and then 0.3 g of ammonium persulfate was added to initiate the polymerization. At 10 hours after the initiation of polymerization, it was confirmed that 99% of the monomer b had reacted by gas chromatography and an emulsion having the solid content of 30% was obtained.

PREPARATIVE EXAMPLE 6

Emulsion polymerization was carried out in the same manner as in Preparative Example 5 using the monomer U3 (a urethane bond-containing monomer) instead of the monomer U2 to give an emulsion having the solid content of 30%.

COMPARATIVE PREPARATIVE EXAMPLE 1

35 g of the monomer b (fluorine-containing acrylate) shown in Table 3, 15 g of stearyl acrylate, 1 g of lauryl mereaptan, 1.5 g of sodium α-olefin sulfonate, 3.5 g of polyoxyethylene nonyl phenyl ether, 10 g of dipropylene glycol monomethyl ether and 114 g of ion-exchanged water were charged and pre-emulsified by using a high pressure homogenizer. This emulsion was transferred to a flask equipped with a stirrer, a thermometer and a reflux condenser, nitrogen purge was conducted sufficiently at 60° C., and then 0.3 g of ammonium persulfate was added to initiate the polymerization. At 10 hours after the initiation of polymerization, it was confirmed that 99% of the monomer b had reacted by gas chromatography and an emulsion having the solid content of 30% was obtained.

The water and oil repellent compositions obtained in Preparative Examples 4 to 6 are shown in Table 4.

TABLE 4

| Preparative Example No. | A Repeating unit (I) | B Repeating unit (II) | C Repeating unit (III) | D Film forming auxiliary (B) | Weight ratio of copolymer A/B/C | Weight ratio based on polymer (A + B + C/D) |
|---|---|---|---|---|---|---|
| 4 | U1 | a | Isoprene | Dipropylene glycol monomethyl ether | 70/20/10 | 100/20 |
| 5 | b | U2 | | | | |
| 6 | b | U3 | | | | |
| Comparative Preparative Example 1 | b | Stearyl acrylate | None | | 70/30/0 | 100/20 |

EXAMPLE 1

Each of the water and oil repellents obtained in Preparative Examples 4 to 6 were diluted with water so as to have solid content of 3% and this liquid was uniformly sprayed on a white cotton broad cloth, a white polyester/cotton-blended broad cloth, a white polyester tropical cloth, a white nylon taffeta cloth so as to be 100 g/m². Spray was carried out using a hand spray. Then, these cloths were dried at room temperature for 24 hours. The water and oil repellency test was carried out for these treated cloths.

The test results are shown in Table 5.

TABLE 5

| | Water repellency | | | | Oil repellency | | | |
|---|---|---|---|---|---|---|---|---|
| Preparative Example No. | White cotton broad cloth | White polyester/cotton broad cloth | White polyester tropical cloth | White nylon taffeta cloth | White cotton broad cloth | White polyester/cotton broad cloth | White polyester tropical cloth | White nylon taffeta cloth |
| 4 | 70+ | 80– | 80– | 70+ | 4 | 4 | 4 | 4 |
| 5 | 80– | 80 | 80+ | 80– | 4 | 4 | 4 | 4 |
| 6 | 80– | 80+ | 80+ | 80– | 4 | 4 | 4 | 4 |
| Comparative Preparative Example 1 | 0 | 0 | 0 | 0 | 1 | 1 | 1 | 1 |

The preparation of the monomer (I) or (II) having a urethane bond is shown in Preparative Examples 7 to 10.

PREPARATIVE EXAMPLE 7 (PREPARATION OF THE PRODUCT X1)

In a flask equipped with a stirrer, a thermometer, a reflux condenser and a dropping funnel, 200 g of 2,4-tolylene diisocyanate was dissolved in 441 g of di-n-butyl adipate (DBA) and heated to 40° C. with stirring. When the temperature of the mixture reached 40° C., three drops of dibutyltin laurate was added and, at the same time, dropwise addition of 533 g of perfluoroalkylethyl alcohol (a perfluoroalkyl group is $CF_3(CF_2)_n$ (the average of n is 7)) was started and it was gently added dropwise over two hours. After the completion of the dropwise addition, 149 g of 2-hydroxyethyl methacrylate was gently added dropwise over two hours. After the completion of the dropwise addition, the stirring was continued for additional two hours with maintaining at 40° C. to give 1,323 g of pale yellow and transparent viscous liquid. Complete disappearance of a —NCO group was confirmed by IR and disappearance of a —OH group, formation of a urethane bond and presence of a double bond were confirmed by $^1$H-NMR and $^{13}$C-NMR. This product was named as X1.

The chemical formula of the product X1 was considered as follows:

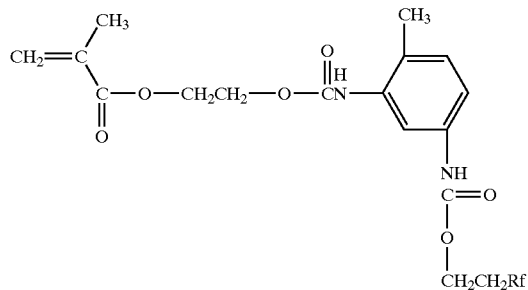

wherein Rf is a perfluoroalkyl group.

PREPARATIVE EXAMPLE 8 (PREPARATION OF THE PRODUCT X2)

PREPARATIVE EXAMPLE 8 (PREPARATION OF THE PRODUCT X2)

In a flask equipped with a stirrer, a thermometer, a reflux condenser and a dropping funnel, 200 g of 2,4-tolylene diisocyanate was dissolved in 260 g of di-n-butyl adipate (DBA) and heated to 40° C. with stirring. When the temperature of the mixture reached to 40° C., three drops of dibutyltin laurate was added and, at the same time, dropwise addition of 170 g of dipropylene glycol m6nomethyl ether was started and it was gently added dropwise over two hours. After the completion of the dropwise addition, 149 g of 2-hydroxyethyl methacrylate was gently dropped over two hours. After the completion of the dropwise addition, the stirring was continued for additional two hours with maintaining at 40° C. to give 779 g of pale yellow and transparent viscous liquid. Complete disappearance of a —NCO group was confirmed by IR and disappearance of a —OH group, formation of a urethane bond and presence of a double bond were confirmed by $^1$H-NMR and $^{13}$C-NMR. This product was named as X2.

The chemical formula of the product X2 was considered as the follows:

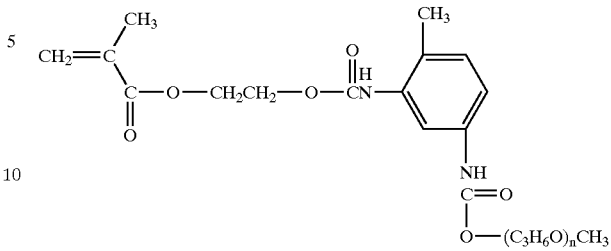

wherein n is 2.

PREPARATIVE EXAMPLE 9 (PREPARATION OF THE PRODUCT X3)

In a flask equipped with a stirrer, a thermometer, a reflux condenser and a dropping funnel, 200 g of 2,4-tolylene diisocyanate was dissolved in 217 g of di-n-butyl adipate (DBA) and heated to 40° C. with stirring. When the temperature of the mixture reached to 40° C., three drops of dibutyltin laurate was added and, at the same time, dropwise addition of 85 g of 2-butanol was started and it was gently added dropwise over two hours. After the completion of the dropwise addition, 149 g of 2-hydroxyethyl methacrylate was gently dropped over two hours. After the completion of the dropwise addition, the stirring was continued for additional two hours with maintaining at 40° C. to give 651 g of pale yellow and transparent viscous liquid. Complete disappearance of a —NCO group was confirmed by IR and disappearance of a —OH group, formation of a urethane bond and presence of a double bond were confirmed by $^1$H-NMR and $^{13}$C-NMR. This product was named as X3.

The chemical formula of the product X3 was considered as follows:

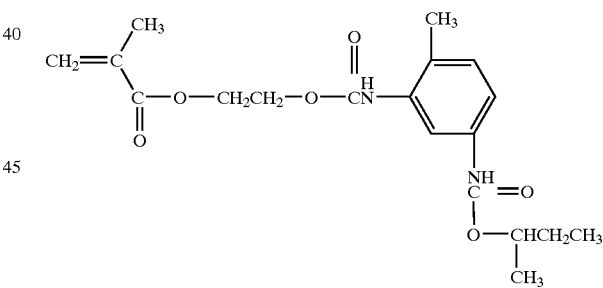

PREPARATIVE EXAMPLE 10 (PREPARATION OF THE PRODUCT X4)

In a flask equipped with a stirrer, a thermometer, a reflux condenser and a dropping funnel, 200 g of 2,4-tolylene diisocyanate was dissolved in 250 g of di-n-butyl adipate (DBA) and heated to 40° C. with stirring. When the temperature of the mixture reached to 40° C., three drops of dibutyltin laurate was added and, at the same time, dropwise addition of 150 g of 2-ethyl hexyl alcohol was started and it was gently added dropwise over two hours. After the completion of the dropwise addition, 149 g of 2-hydroxyethyl methacrylate was gently dropped over two hours. After the completion of the dropwise addition, the stirring was continued for additional two hours with maintaining at 40° C. to give 749 g of pale yellow and transparent viscous liquid. Complete disappearance of a —NCO group was confirmed by IR and disappearance of a —OH group, formation of a urethane bond and presence of a double bond were confirmed by $^1$H-N and $^{13}$C-NMR. This product was named as X4.

The chemical formula of the product X4 was considered as follows:

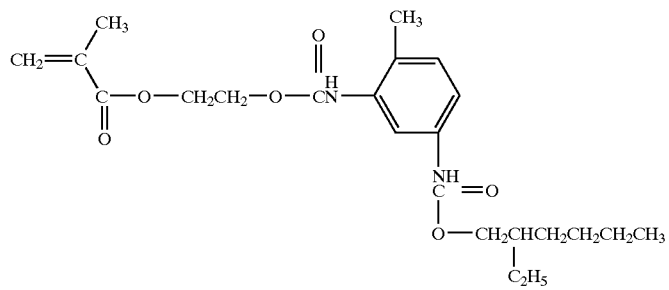

The preparation of the water and oil repellent containing the copolymer (A) and the film-forming auxiliary (B) is shown in Preparative Examples 11 to 17. In Preparative Examples 11 to 17, in particular the monomers shown in Tables 6 and 7 were used.

Example 7, 6.5 g of lauryl methacrylate, 0.8 g of 3-chloro-2-hydroxypropyl methacrylate, 0.3 g of glucosyl ethyl methacrylate (50% aqueous solution), 1.3 g of lauryl mercaptan, 0.4 g of di hardened beef tallow alkyl dimethyl ammonium chloride (active ingredient of 75%), 5 g of ethanol, 200 g of ion-exchanged water; and 0.1 g of di-n-butyl adipate, 10.6 g of butyl carbitol acetate and 10.4 g of dipropylene glycol monomethyl ether as a film-forming auxiliary were charged and pre-emulsified by using a high pressure homogenizer. This emulsion was transferred to a flask equipped with a stirrer, a thermometer and a reflux condenser, nitrogen purge was conducted sufficiently at 60° C., and then 0.1 g of

TABLE 6

|  |  |  | Preparative Example 11 | Preparative Example 12 | Preparative Example 13 | Preparative Example 14 | Preparative Example 15 |
|---|---|---|---|---|---|---|---|
| Copolymer (A) | Monomer (I) | X1 (Preparative Example 7) | 71% | — | — | 54% | — |
|  |  | Monomer b (Table 3) | — | 55% | 54% | — | 54% |
|  | Monomer (II) | X2 (Preparative Example 8) | — | — | — | — | — |
|  |  | X3 (Preparative Example 9) | — | — | — | — | — |
|  |  | X4 (Preparative Example 10) | — | 45% | — | — | — |
|  |  | Monomer a (Table 3) | — | — | — | — | 23% |
|  | Monomer (III) | Lauryl methacrylate | 25% | — | 46% | 46% | 23% |
|  | Monomer (IV) | Glucosyl ethyl methacrylate | 1% | — | — | — | — |
|  | Monomer (V) | 3-Chloro-2-hydroxypropyl methacrylate | 3% | — | — | — | — |
|  |  | Stearyl acrylate | — | — | — | — | — |
| Film-forming auxiliary (B) | Di-n-butyl adipate |  | 36% to (A) | 23% to (A) | 23% to (A) | 27% to (A) | — |
|  | Butyl carbitol acetate |  | 41% to (A) | — | — | — | — |
|  | Dipropylene glycol monomethyl ether |  | 41% to (A) | — | — | — | — |

TABLE 7

|  |  |  | Preparative Example 16 | Preparative Example 17 | Preparative Example 18 | Comparative Preparative Example 2 |
|---|---|---|---|---|---|---|
| Copolymer (A) | Monomer (I) | X1 (Preparative Example 7) | — | — | — | — |
|  |  | Monomer b (Table 3) | 59% | 59% | 59% | 67% |
|  | Monomer (II) | X2 (Preparative Example 8) | 22% | — | — | — |
|  |  | X3 (Preparative Example 9) | — | 22% | — | — |
|  |  | X4 (Preparative Example 10) | — | — | 22% | — |
|  | Monomer (III) | Lauryl methacrylate | 15% | 15% | 15% | — |
|  | Monomer (IV) | Glucosyl ethyl methacrylate | 1% | 1% | 1% | — |
|  | Monomer (V) | 3-Chloro-2-hydroxypropyl methacrylate | 3% | 3% | 3% | — |
|  |  | Stearyl acrylate | — | — | — | 33% |
| Film-forming auxiliary (B) | Di-n-butyl adipate |  | 11% to (A) | 11% to (A) | 11% to (A) | — |
|  | Butyl carbitol acetate |  | 33% to (A) | 33% to (A) | 33% to (A) | — |
|  | Dipropylene glycol monomethyl ether |  | 33% to (A) | 33% to (A) | 33% to (A) | — |

PREPARATIVE EXAMPLE 11

27.3 g of X1 (a fluorine-containing monomer, 66.7% di-n-butyl adipate solution) synthesized in Preparative Example 7, 6.5 g of lauryl methacrylate, 0.8 g of 3-chloro-2,2'-azobis(2-amidinopropane)dihydrochloride was added to initiate the polymerization. At 5 hours after the initiation of polymerization, it was confirmed that 99% of X1 had reacted by gas chromatography and an emulsion having the solid content of 10% was obtained.

PREPARATIVE EXAMPLE 12

25.5 g of the monomer b (a fluorine-containing monomer) shown in Table 3, 31.5 g of X4 (a urethane bond-containing monomer, 66.7% di-n-butyl adipate solution) synthesized in Preparative Example 10, 2.5 g of lauryl mercaptan, 0.4 g of stearyl trimethyl ammonium chloride (active ingredient of 30%), 0.6 g of polyoxyethylene octyl phenyl ether, 0.4 g of polyoxyethylene sorbitan monolaurate, 100 g of ion-exchanged water and 0.4 g of di-n-butyl adipate as a film-forming auxiliary were charged and pre-emulsified by using a high pressure homogenizer. This emulsion was transferred to a flask equipped with a stirrer, a thermometer and a reflux condenser, nitrogen purge was conducted sufficiently at 60° C., and then 0.3 g of 2,2'-azobis(2-amidinopropane)dihydrochloride was added to initiate the polymerization. At 5 hours after the initiation of polymerization, it was confirmed that 99% of the monomer b had reacted by gas chromatography and an emulsion having the solid content of 30% was obtained.

PREPARATIVE EXAMPLE 13

25.5 g of the monomer b (a fluorine-containing monomer) shown in Table 3, 21.9 g of lauryl methacrylate, 2.5 g of lauryl mercaptan, 0.4 g of stearyl trimethyl ammonium chloride (active ingredient of 30%), 0.6 g of polyoxyethylene octyl phenyl ether, 0.4 g of polyoxyethylene sorbitan monolaurate, 100 g of ion-exchanged water and 10.9 g of di-n-butyl adipate as a film-forming auxiliary were charged and pre-emulsified by using a high pressure homogenizer. This emulsion was transferred to a flask equipped with a stirrer, a thermometer and a reflux condenser, nitrogen purge was conducted sufficiently at 60° C., and then 0.3 g of 2,2'-azobis(2-amidinopropane)-dihydrochloride was added to initiate the polymerization. At 5 hours after the initiation of polymerization, it was confirmed that 99% of the monomer b had reacted by gas chromatography and an emulsion having the solid content of 30% was obtained.

PREPARATIVE EXAMPLE 14

38.2 g of X1 (a fluorine-containing monomer, 66.7% di-n-butyl adipate solution) synthesized in Preparative Example 7, 21.9 g of lauryl methacrylate, 2.5 g of lauryl mercaptan, 0.4 g of stearyl trimethyl ammonium chloride (active ingredient of 30%), 0.6 g of polyoxyethylene octyl phenyl ether, 0.4 g of polyoxyethylene sorbitan monolaurate, 100 g of ion-exchanged water and 0.1 g of di-n-butyl adipate as a film-forming auxiliary were charged and pre-emulsified by using a high pressure homogenizer. This emulsion was transferred to a flask equipped with a stirrer, a thermometer and a reflux condenser, nitrogen purge was conducted sufficiently at 60° C., and then 0.3 g of 2,2'-azobis(2-amidinopropane)dihydrochloride was added to initiate the polymerization. At 5 hours after the initiation of polymerization, it was confirmed that the monomer b of 99% had reacted by gas chromatography and an emulsion having the solid content of 30% was obtained.

PREPARATIVE EXAMPLE 15

25.5 g of the monomer b (a fluorine-containing monomer) shown in Table 3, 11.0 g of the monomer a (a urethane bond-containing monomer) shown in Table 3, 11.0 g of lauryl methacrylate, 2.5 g of lauryl mercaptan, 0.4 g of stearyl trimethyl ammonium chloride (active ingredient of 30%), 0.6 g of polyoxyethylene octyl phenyl ether, 0.4 g of polyoxyethylene sorbitan monolaurate and 110.9 g of ion-exchanged water were charged and pre-emulsified by using a high pressure homogenizer. This emulsion was transferred to a flask equipped with a stirrer, a thermometer and a reflux condenser, nitrogen purge was conducted sufficiently at 60° C., and then 0.3 g of 2,2'-azobis(2-amidinopropane) dihydrochloride was added to initiate the polymerization. At 5 hours after the initiation of polymerization, it was confirmed that 99% of the monomer b had reacted by gas chromatography and an emulsion having the solid content of 30% was obtained.

PREPARATIVE EXAMPLE 16

152 g of the monomer b (a fluorine-containing monomer) shown in Table 3 and 85 g of X2 (a urethane bond-containing monomer, 66.7% di-n-butyl adipate solution) synthesized in Preparative Example 8, 40 g of lauryl methacrylate, 7.5 g of 3-chloro-2-hydroxypropyl methacrylate, 5 g of glucosyl ethyl methacrylate (50% aqueous solution), 12.5 g of lauryl mercaptan, 3.5 g of di hardened beef tallow alkyl dimethyl ammonium chloride (active ingredient of 75%), 1,250 g of ion-exchanged water; and 1 g of di-n-butyl adipate, 86 g of butyl carbitol acetate and 84.5 g of dipropylene glycol monomethyl ether as a film-forming auxiliary were charged and pre-emulsified by using a high pressure homogenizer. This emulsion was transferred to a flask equipped with a stirrer, a thermometer and a reflux condenser, nitrogen purge was conducted sufficiently at 60° C., and then 0.5 g of 2,2'-azobis(2-amidinopropane)dihydrochloride was added to initiate the polymerization. At 5 hours after the initiation of polymerization, it was confirmed that 99% of the monomer b had reacted by gas chromatography and an emulsion having the solid content of 15% was obtained.

PREPARATIVE EXAMPLE 17

Emulsion polymerization was carried out in the same manner as in Preparative Example 16 using X3 (a urethane bond containing monomer, 66.7% di-n-butyl adipate solution) synthesized in Preparative Example 9 instead of X2 (a urethane bond-containing monomer, 66.7% di-n-butyl adipate solution) synthesized in Preparative Example 8 to give an emulsion having the solid content of 15%.

PREPARATIVE EXAMPLE 18

Emulsion polymerization was carried out in the same manner as in Preparative Example 16 using X4 (a urethane bond-containing monomer, 66.7% di-n-butyl adipate solution) synthesized in Preparative Example 10 instead of X2 (a urethane bond-containing monomer, 66.7% di-butyl adipate solution) synthesized in Preparative Example 8 to give an emulsion having the solid content of 15%.

COMPARATIVE PREPARATIVE EXAMPLE 2

30 g of the monomer b (a fluorine-containing monomer) shown in Table 3, 15 g of stearyl acrylate, 1 g of lauryl mercaptan, 1.5 g of di hardened beef tallow alkyl dimethyl ammonium chloride and 114 g of ion-exchanged water were charged and pre-emulsified by using a high pressure homogenizer. This emulsion was transferred to a flask equipped with a stirrer, a thermometer and a reflux condenser, nitrogen purge was conducted sufficiently at 60° C., and then 0.3 g of 2,2'-azobis(2-amidinopropane)-dihydrochloride was added to initiate the polymerization. At 5 hours after the initiation of polymerization, it was confirmed that 99% of the monomer b had reacted by gas chromatography and an emulsion having the solid content of 30% was obtained.

For the compositions (the water and oil repellents) obtained in Preparative examples 11 to 17 and Comparative Preparative Example 2, the following evaluation was carried out.

EXAMPLE 2

Each of the water and oil repellents obtained in Preparative Examples 11 to 17 and Comparative Preparative Example 2 was diluted with ion-exchanged water so as to have a solid content of 4% and this liquid was uniformly sprayed on a white cotton broad cloth, a white polyester/cotton-blended broad cloth, a white polyester tropical cloth and a white nylon taffeta cloth so as to be 100 g/m$^2$. Spray was carried out using a hand spray (a trigger type container). Then, these cloths were dried at room temperature for 24 hours. The water and oil repellency test were carried out for these treated cloths. The test results are shown in Tables 8 and 9.

EXAMPLE 3

Each of the water and oil repellents obtained in Preparative Examples 11 to 17 and Comparative Preparative Example 2 was diluted with ion-exchanged water so as to have solid content of 4% and this liquid was charged in an aerosol can. CO$_2$ as a propellant was further charged thereto and the container was sealed. The weight ratio of the water and oil repellent to the propellant was 50/50. The aerosol was uniformly sprayed on a white cotton broad cloth, a white polyester/cotton-blended broad cloth, a white polyester tropical cloth and a white nylon taffeta cloth so as to be 100 g/m$^2$, and then these cloths were dried at room temperature for 24 hours. The water and oil repellency test was carried out for these treated cloths. The test results are shown in Tables 8 and 9.

EXAMPLE 4

Each of the water and oil repellents obtained in Preparative Examples 11 to 17 and Comparative Preparative Example 2 was diluted with ion-exchanged water so as to have solid content of 4% and then 1% of alkyl trimethyl ammonium chloride was added per 100% of the emulsion obtained. This liquid was charged in a container equipped with a nozzle having a pore at its ejection port and the treatment agent in the form of foam was propelled from the container. Then, the treatment agent in the form of foam was placed on a white cotton broad cloth, a white polyester/cotton-blended broad cloth, a white polyester tropical cloth and a white nylon taffeta cloth, uniformly applied with a sponge so as to be 100 g/m$^2$, and then these cloths were dried at room temperature for 24 hours. The water and oil repellency test were carried out for these treated cloths.

The test results are shown in Tables 8 and 9.

TABLE 8

| | | Preparative Example 11 | Preparative Example 12 | Preparative Example 13 | Preparative Example 14 | Preparative Example 15 |
|---|---|---|---|---|---|---|
| Example 2 Water repellency | White cotton broad cloth | 70 | 80 | 70+ | 70− | 70− |
| | White polyester/cotton (=65/35) broad cloth | 70+ | 80 | 70+ | 70 | 50+ |
| | White polyester tropical cloth | 80− | 80+ | 80 | 80− | 50+ |
| | White nylon taffeta cloth | 70+ | 80 | 70+ | 70+ | 0 |
| Oil repellency | White cotton broad cloth | 4 | 4 | 4 | 4 | 3 |
| | White polyester/cotton (=65/35) broad cloth | 4 | 4 | 4 | 4 | 2 |
| | White polyester tropical cloth | 4 | 5 | 4 | 4 | 2 |
| | White nylon taffeta cloth | 4 | 6 | 4 | 4 | 1 |
| Example 3 Water repellency | White cotton broad cloth | 70 | 80 | 70+ | 70 | 70 |
| | White polyester/cotton (=65/35) broad cloth | 70+ | 80 | 70+ | 70 | 50+ |
| | White polyester tropical cloth | 80 | 80+ | 80 | 80 | 50+ |
| | White nylon taffeta cloth | 70+ | 80 | 70+ | 70+ | 0 |
| Oil repellency | White cotton broad cloth | 4 | 4 | 4 | 4 | 3 |
| | White polyester/cotton (=65/35) broad cloth | 4 | 4 | 4 | 4 | 2 |
| | White polyester tropical cloth | 4 | 5 | 4 | 4 | 2 |
| | White nylon taffeta cloth | 4 | 6 | 4 | 4 | 1 |
| Example 4 Water repellency | White cotton broad cloth | 70− | 70+ | 70− | 70− | 50 |
| | White polyester/cotton (=65/35) broad cloth | 70− | 70+ | 70− | 70− | 50 |
| | White polyester tropical cloth | 70 | 80+ | 70+ | 70 | 0 |
| | White nylon taffeta cloth | 70− | 70+ | 70 | 70 | 0 |
| Oil repellency | White cotton broad cloth | 4 | 4 | 4 | 4 | 2 |
| | White polyester/cotton (=65/35) broad cloth | 4 | 4 | 4 | 4 | 1 |
| | White polyester tropical cloth | 4 | 5 | 4 | 4 | 1 |
| | White nylon taffeta cloth | 4 | 5 | 4 | 4 | 1 |

TABLE 9

| | | Preparative Example 16 | Preparative Example 17 | Preparative Example 18 | Comparative Preparative Example 2 |
|---|---|---|---|---|---|
| Example 2 Water repellency | White cotton broad cloth | 80+ | 90 | 90 | 0 |
| | White polyester/cotton (=65/35) broad cloth | 80+ | 90 | 90 | 0 |
| | White polyester tropical cloth | 90− | 90 | 90 | 0 |
| | White nylon taffeta cloth | 90− | 90 | 90 | 0 |
| Oil repellency | White cotton broad cloth | 5 | 5 | 5 | 1 |
| | White polyester/cotton (=65/35) broad cloth | 5 | 5 | 5 | 1 |
| | White polyester tropical cloth | 5 | 6 | 6 | 1 |
| | White nylon taffeta cloth | 5 | 6 | 5 | 1 |

TABLE 9-continued

|  |  |  | Preparative Example 16 | Preparative Example 17 | Preparative Example 18 | Comparative Preparative Example 2 |
|---|---|---|---|---|---|---|
| Example 3 | Water repellency | White cotton broad cloth | 80+ | 80+ | 80+ | 0 |
|  |  | White polyester/cotton (=65/35) broad cloth | 80+ | 90 | 90 | 0 |
|  |  | White polyester tropical cloth | 90− | 90 | 90 | 0 |
|  |  | White nylon taffeta cloth | 90− | 90 | 90 | 0 |
|  | Oil repellency | White cotton broad cloth | 5 | 5 | 5 | 1 |
|  |  | White polyester/cotton (=65/35) broad cloth | 5 | 5 | 5 | 1 |
|  |  | White polyester tropical cloth | 5 | 6 | 6 | 1 |
|  |  | White nylon taffeta cloth | 5 | 6 | 5 | 1 |
| Example 4 | Water repellency | White cotton broad cloth | 80 | 80+ | 80+ | 0 |
|  |  | White polyester/cotton (=65/35) broad cloth | 80 | 80+ | 80+ | 0 |
|  |  | White polyester tropical cloth | 80+ | 80+ | 80+ | 0 |
|  |  | White nylon taffeta cloth | 80+ | 80+ | 80+ | 0 |
|  | Oil repellency | White cotton broad cloth | 4 | 5 | 5 | 0 |
|  |  | White polyester/cotton (=65/35) broad cloth | 4 | 5 | 5 | 0 |
|  |  | White polyester tropical cloth | 5 | 5 | 5 | 0 |
|  |  | White nylon taffeta cloth | 5 | 5 | 5 | 0 |

EFFECTS OF THE INVENTION

The composition of the present invention is superior in processability at low temperature and a property of forming a smooth film.

What is claimed is:

1. A composition comprising
   (A) a copolymer which comprises
      (I) repeating units which are derived from a monomer having a fluoroalkyl group, a carbon-carbon double bond, and optionally a urethane or urea bond,
      (II) repeating units which are derived from a monomer having a urethane or urea bond and one carbon-carbon double bond, but no fluorine atom,
      (III) repeating units which are derived from a monomer having a carbon-carbon double bond, the homopolymer of said monomer having a glass transition temperature (Tg) of 50° C. or less,
      (IV) repeating units which are derived from a monomer having a hydrophilic group and a carbon-carbon double bond, and
      (V) repeating units which are derived from a monomer having a chlorine atom and a carbon-carbon double bond and
   (B) a film-forming auxiliary consisting of an organic solvent, which dissolves or swells the copolymer, wherein said film-forming auxiliary (B) has a solubility parameter (sp) at 25° C. in the range between 8 and 11, said film-forming auxiliary (B) is at least one solvent selected from the group consisting of alcohols, glycol ethers, linear or cyclic silicones, esters, diesters, ketones and ethers, and the composition is in the form of an aqueous dispersion of the copolymer dispersed in a medium comprising water in the presence of a nonionic, cationic or anionic emulsifier.

2. A composition according to claim 1, wherein a monomer having no urethane bond, which constitutes said repeating units (I), is a compound of the formula:

$$Rf—R^1—OCO—C(R^2)=CH_2$$

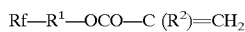

wherein Rf is a linear or branched fluoroalkyl group having 3 to 20 carbon atoms;
$R^1$ is a linear or branched alkylene group having 1 to 20 carbon atoms, a group of the formula: $—SO_2N(R^3)R^4—$ or a group of the formula: $—CH_2CH(OR^5)CH_2—$ in which $R^3$ is an alkyl group having 1 to 10 carbon atoms, $R^4$ is a linear or branched alkylene group having 1 to 10 carbon atoms, and $R^5$ is a hydrogen atom or an acyl group having 1 to 10 carbon atoms; and R is a hydrogen atom or a methyl group.

3. A composition according to claim 1, wherein a monomer having a urethane or urea bond and a fluoroalkyl group, which constitutes said repeating units (I), is a monomer obtained by reacting
   (I-a) a compound having at least two isocyanate groups,
   (I-b) a compound having one carbon-carbon double bond and at least one hydroxyl or amino group, and
   (I-c) a compound having a fluoroalkyl group and one hydroxyl or amino group.

4. A composition according to claim 1, wherein a monomer which constitutes said repeating units (II) is a monomer obtained by reacting
   (II-a) a compound having at least two isocyanate groups, and
   (II-b) a compound having one carbon-carbon double bond and at least one hydroxyl or amino group with
      (II-c-1) a compound having at least one hydroxyl or amino group, and a polyoxyalkylene chain or a polysiloxane chain, or
      (II-c-2) a compound having at least one hydroxyl or amino group.

5. A composition according to claim 1, wherein said repeating units (III) are derived from a monomer having conjugated double bonds or one or two carbon-carbon double bonds, and the homopolymer of which has a glass transition temperature (Tg) of 50° C. or less.

6. A composition according to claim 1, wherein said repeating units (III) are derived from a monomer, the homopolymer of which has a glass transition temperature (Tg) of 30° C. or less.

7. A composition according to claim 1, wherein said repeating units (III) are derived from a monomer, the homopolymer of which has a glass transition temperature (Tg) of 0° C. or less.

8. A composition according to claim 1, wherein said film-forming auxiliary is at least one solvent selected from the group consisting of glycol ethers, esters and diesters.

9. A composition according to claim 1, which is in the form of an aqueous dispersion of the copolymer dispersed in a medium comprising water in the presence of a cationic emulsifier.

10. A water and oil repellent comprising a composition as claimed in claim 1.

11. A method for imparting water and oil repellency to a substrate comprising applying a water and oil repellent as claimed in claim 10 the substrate by spraying, coating or dipping.

12. A water and oil repellent which is in the form of an emulsion comprising a composition as claimed in claim 1.

13. A water and oil repellent product comprising a water and oil repellent as claimed in claim 12 and an application apparatus.

14. A water and oil repellent product comprising a water and oil repellent as claimed in claim 12 which is charged in a container equipped with a mechanism for spraying a liquid outside of said container.

15. A water and oil repellent product comprising a water and oil repellent as claimed in claim 12 which is charged in a container equipped with a mechanism for propelling a liquid outside of said container using a pressure.

16. A water and oil repellent in the form of foam or mousse comprising a composition as claimed in claim 1.

17. A water and oil repellent product comprising a water and oil repellent as claimed in claim 16 which is charged in a container equipped with a mechanism for foaming and propelling a liquid outside of said container.

18. A method for imparting water and oil repellency to a substrate comprising applying on said substrate the water and oil repellent of claim 12 by spraying, coating or dipping.

19. A method for imparting water and oil repellency to a substrate according to claim 18 which further comprises dehydrating said substrate after applying the water and oil repellent.

20. A water and oil repellent in the form of an aerosol comprising a composition as claimed in claim 1.

21. A water and oil repellent product comprising water and oil repellent as claimed in claim 20.

22. A water and oil repellent product comprising a water and oil repellent as claimed in claim 20 which is charged in a container equipped with a mechanism for spraying a liquid outside of said container.

23. A water and oil repellent in the state of a solid comprising a composition as claimed in claim 1.

24. A water and oil repellent product comprising a water and oil repellent as claimed in claim 23.

25. A water and oil repellent in the form of a paste comprising a composition as claimed in claim 1.

26. A water and oil repellent product comprising a water and oil repellent as claimed in claim 1.

27. A composition comprising
   (A) a copolymer, which comprises
      (I) repeating units which are derived from a monomer having a fluoroalkyl group, a carbon-carbon double bond, and optionally a urethane or urea bond,
      (II) repeating units which are derived from a monomer having a urethane or urea bond and one carbon-carbon double bond, but no fluorine atom,
      (III) repeating units which are derived from a monomer having a carbon-carbon double bond, the homopolymer of said monomer having a glass transition temperature (Tg) of 50° C. or less,
      (IV) optional repeating units which are derived from a monomer having a carbon-carbon double bond and a hydrophilic group selected from a carboxyl group, a phosphate group and a sulfate group, or
      a monomer selected from the group consisting of 2-hydroxy-3-phenoxypropyl acrylate, 2-acryloyloxyethyl-2-hydroxyethylphthalic acid, hydroxypropyl methacrylate trimethylammonium chloride, glucosylethyl methacrylate, 2-hydroxy-3-acryloyloxypropyl methacrylate and neopentyl glycol hydroxypivalate diacrylate, and
      (V) optional repeating units which are derived from a monomer having a chlorine atom and a carbon-carbon double bond and
   (B) a film-forming auxiliary consisting of an organic solvent which dissolves or swells the copolymer,
wherein at least one of the repeating units (IV) and the repeating units (V) is essential, said film-forming auxiliary (B) has a solubility parameter (sp) at 25° C. in the range between 8 and 11, said film-forming auxiliary (B) is at least one solvent selected from the group consisting of alcohols, glycol ethers, linear or cyclic silicones, esters, diesters, ketones and ethers, and the composition is in the form of an aqueous dispersion of the copolymer dispersed in a medium comprising water in the presence of a nonionic, cationic or anionic emulsifier.

28. A composition comprising
   (A) a copolymer which comprises
      (I) repeating units which are derived from a monomer having a fluoroalkyl group, a carbon-carbon double bond, and optionally a urethane or urea bond,
      (II) repeating units which are derived from a monomer having a urethane or urea bond and one carbon-carbon double bond, but no fluorine atom,
      (III) repeating units which are derived from a monomer having a carbon-carbon double bond, the homopolymer of said monomer having a glass transition temperature (Tg) of 50° C. or less,
      (IV) optional repeating units which are derived from a monomer having a hydrophilic group and a carbon-carbon double bond, and
      (V) optional repeating units which are derived from a monomer having a chlorine atom and a carbon-carbon double bond and
   (B) a film-forming auxiliary consisting of an organic solvent which dissolves or swells the copolymer,
wherein at least one of the repeating units (IV) and the repeating units (V) is essential, said film-forming auxiliary (B) has a solubility parameter (sp) at 25° C. in the range between 8 and 11, said film-forming auxiliary (B) is at least one solvent selected from the group consisting of glycol ethers and diesters, and the composition is in the form of an aqueous dispersion of the copolymer dispersed in a medium comprising water in the presence of a nonionic, cationic or anionic emulsifier.

* * * * *